US012441598B1

(12) United States Patent
Liao

(10) Patent No.: US 12,441,598 B1

(45) Date of Patent: Oct. 14, 2025

(54) LIQUID FILLING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 18/635,322

(22) Filed: Apr. 15, 2024

(51) Int. Cl.
*B67D 7/04* (2010.01)
*B67D 7/18* (2010.01)

(52) U.S. Cl.
CPC *B67D 7/04* (2013.01); *B67D 7/18* (2013.01)

(58) Field of Classification Search
CPC .................................... B67D 7/18; B67D 7/60
See application file for complete search history.

(56) References Cited

U.S. PATENT DOCUMENTS 1,684,080 A * 9/1928 Zerk ......................... F16N 3/12 222/260
1,688,571 A * 10/1928 Zerk ....................... F16N 21/04 184/105.3
2,082,521 A * 6/1937 Schneider ................. F16N 3/12 141/285
2,491,259 A * 12/1949 Funderburg .............. F16N 3/12 222/386
3,186,597 A * 6/1965 Henderson ............... B67D 7/60 222/387
4,174,055 A * 11/1979 Capra ................... B05B 9/0883 222/340
6,360,922 B1 * 3/2002 Englhard .............. B05B 1/3026 222/321.9

FOREIGN PATENT DOCUMENTS

CN 2065277 U * 11/1990 ............... F16N 3/00

* cited by examiner

*Primary Examiner* — Timothy L Maust

(74) *Attorney, Agent, or Firm* — Muncy, Geissler, Olds & Lowe, P.C.

(57) ABSTRACT

A liquid filling device is provided, including: a barrel, a piston assembly and a force accumulating assembly. The barrel defines an axial direction and includes a liquid storage space and a through hole communicated with the liquid storage space. The piston assembly includes a piston and a push rod connected with the piston, and the piston is axially movable and is disposed in the liquid storage space. The force accumulating assembly is disposed between the barrel and the piston assembly, and when the force accumulating assembly accumulates force, the piston is driven by the force accumulating assembly to move and push a liquid in the liquid storage space. Therefore, the liquid filling device can fill the liquid automatically, which is laborsaving.

9 Claims, 5 Drawing Sheets

LIQUID FILLING DEVICE

BACKGROUND OF THE INVENTION

Field of the Invention

The present invention relates to a liquid filling device.

Description of the Prior Art

In a conventional oil supplying way for a vehicle, generally, an operator opens an opening of an oil tank of the vehicle and handholds an oil can (such as a gasoline or a brake oil) to pour an oil into the opening of the oil tank for supplying a proper oil amount. However, the conventional oil supplying way would have the oil be carelessly dripped out from the oil tank; thereby the oil is wasted and an environment is polluted. Thus, a conventional oil supplying apparatus is provided for overcoming said waste and pollution.

The conventional oil supplying apparatus comprises a tube body and a piston, and the piston is movable in the tube body for pressing the oil in the tube body, so that an outlet of the tube body can be directly communicated with the opening of the oil tank to reduce the waste of oil.

However, the oil is viscous and has poor fluidity so that the operator has to push the piston hard during filling the oil, which is inconvenient to operate and is laborious. In addition, the outlet of the tube body is easy to be detached from the oil tank due to incorrect force application direction.

The present invention is, therefore, arisen to obviate or at least mitigate the above-mentioned disadvantages.

SUMMARY OF THE INVENTION

The main object of the present invention is to provide a liquid filling device, which can fill liquid automatically and is laborsaving.

To achieve the above and other objects, the present invention provides a liquid filling device, including: a barrel, a piston assembly and a force accumulating assembly. The barrel defines an axial direction and includes a liquid storage space and a through hole communicated with the liquid storage space. The piston assembly includes a piston and a push rod connected with the piston, and the piston is axially movable and is disposed in the liquid storage space. The force accumulating assembly is disposed between the barrel and the piston assembly. When the force accumulating assembly accumulates force, the piston is driven by the force accumulating assembly to move and push a liquid in the liquid storage space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
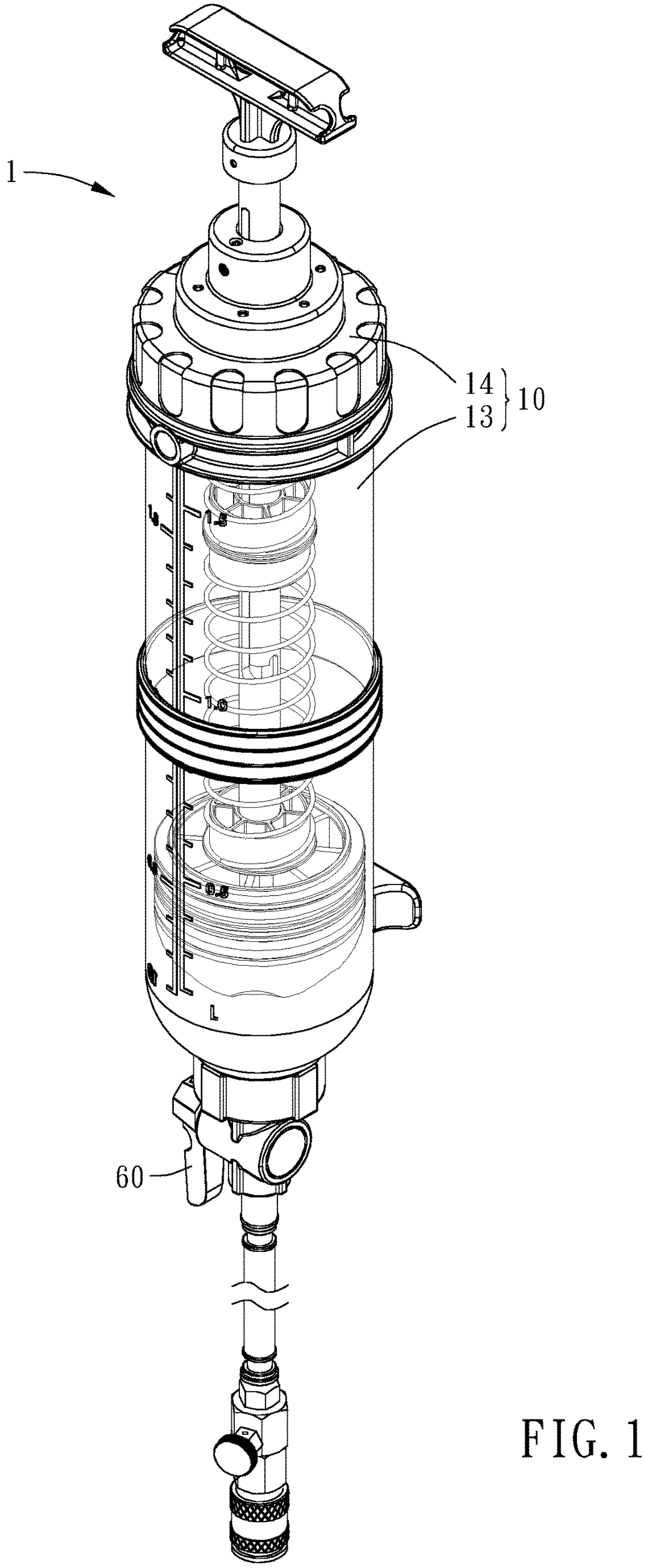
FIG. 1 is a stereogram of a preferable embodiment of the present invention.
Figure 2:
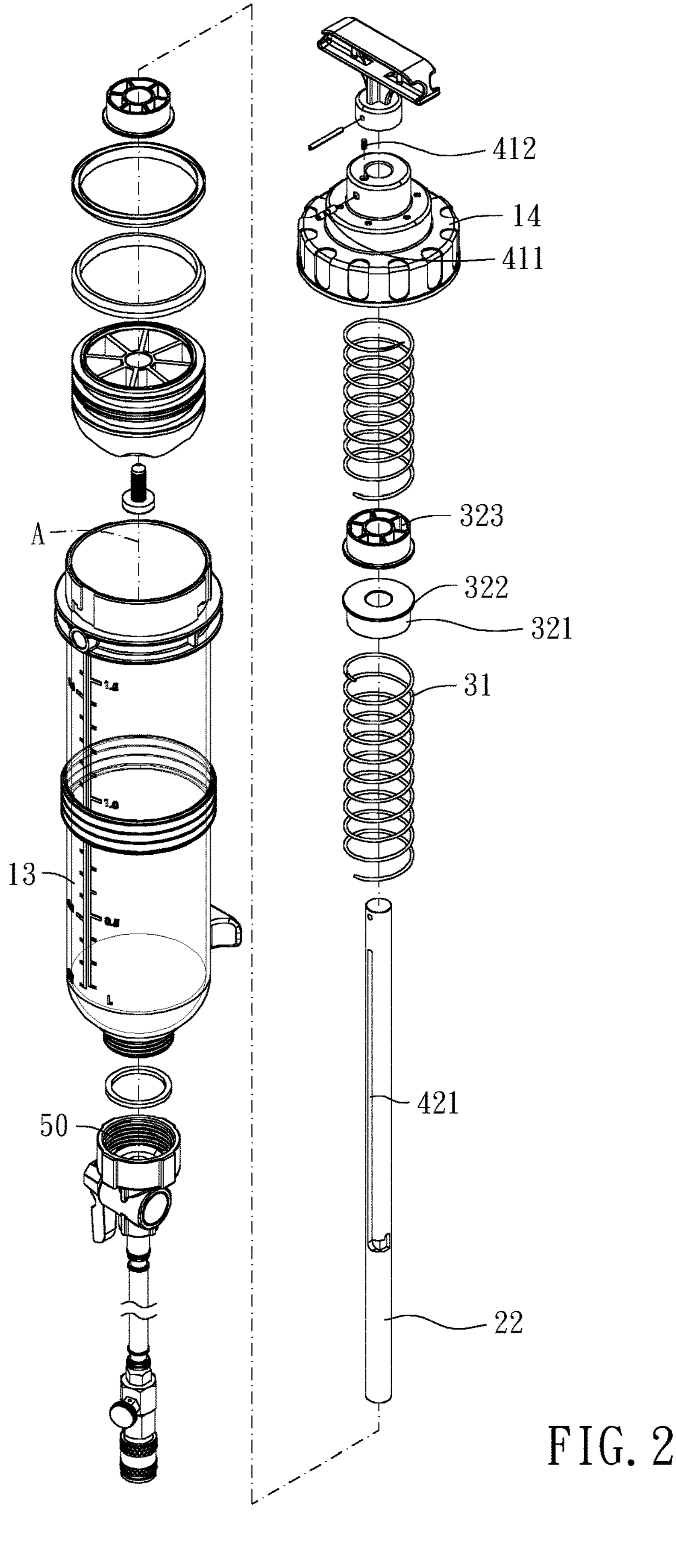
FIG. 2 is a breakdown drawing of a preferable embodiment of the present invention.

Please refer to FIGS. 1 to 5 for a preferable embodiment of the present invention. A liquid filling device 1 of the present invention includes a barrel 10, a piston assembly 20 and a force accumulating assembly 30.

The barrel 10 defines an axial direction A and includes a liquid storage space 11 and a through hole 12 communicated with the liquid storage space 11. The piston assembly 20 includes a piston 21 and a push rod 22 connected with the piston 21, and the piston 21 is axially movable and is disposed in the liquid storage space 11. The force accumulating assembly 30 is disposed between the barrel 10 and the piston assembly 20. When the force accumulating assembly 30 accumulates force, the piston 21 is driven by the force accumulating assembly 30 to move and push a liquid in the liquid storage space 11. Therefore, the liquid filling device 1 can fill the liquid (such as oil) automatically, which is laborsaving and easy to use.

The force accumulating assembly 30 includes at least one elastic member 31 sleeved to the push rod 22, and the at least one elastic member 31 is elastically abutted against and between the barrel 10 and the piston 21. The at least one elastic member 31 accumulates force when the push rod 22 drives the piston 21 to move in a direction remote from the through hole 12 so that the at least one elastic member 31 is deformed and accumulates force when the liquid is drawn into the liquid storage space 11. In the axial direction A, a distance that the piston 21 driven to move by the force accumulating assembly 30 is larger than or equal to ¼ of a length of the liquid storage space 11 so as to effectively push the liquid for laborsaving effect.

In this embodiment, the force accumulating assembly 30 includes two said elastic members 31 and at least one connecting member 32 sleeved to the push rod 22, and the at least one connecting member 32 is movable relative to the push rod 22. The two said elastic members 31 are located at two opposite sides of the at least one connecting member 32 and elastically abutted against and between the barrel 10 and the piston 21. Therefore, the two said elastic members 31 provides sufficient elastic force and are not easy to be skewed when being compressed. Specifically, each said connecting member 32 includes an annular wall 321 and a flange 322 radially protruding from the annular wall 321, and two said connecting members 32 are abutted against each other through respective sides on which said flanges 322 are provided. An end of each of the two said elastic members 31 is sleeved to one said annular wall 321 and axially abutted against one said flange 322 so as to be assembled stably, prevent unexpected deformation of the two said elastic members 31, and keep the elastic force of the two said elastic members 31 acting in the axial direction A. Preferably, each said connecting member 32 further includes a plurality of notches 323 for light weight and good structural strength.

The liquid filling device 1 further includes a locking mechanism 40, and the locking mechanism 40 includes a first positioning portion 41 disposed on the barrel 10 and a second positioning portion 42 disposed on the piston assembly 20. The second positioning portion 42 is movable relative to the first positioning portion 41 between a locking position and a release position. When the push rod 22 drives the piston 21 to move in the direction remote from the through hole 12 and the force accumulating assembly 30 accumulates force, the second positioning portion 42 is moved to the locking position so that the piston 21 is unmovable in a direction toward the through hole 12. After the liquid filling device 1 completes liquid filling and the force accumulating assembly 30 accumulates force, the second positioning portion 42 is moved to the locking position to prevent the force accumulating assembly 30 from moving and prevent the liquid from being unexpectedly squeezed out of the barrel 10.

Specifically, one of the first positioning portion 41 and the second positioning portion 42 is an engaging recess, and the other of the first positioning portion 41 and the second positioning portion 42 is an engaging projection axially engaged within the engaging recess. In this embodiment, the first positioning portion 41 includes an insertion member 411, and the second positioning portion 42 includes a slot 421 disposed on the push rod 22. At least a portion of the insertion member 411 is movably disposed within the slot 421, and the slot 421 includes a guiding section 422 extending in the axial direction A and an engaging section 423 extending transversely to the guiding section 422. The push rod 22 is rotatable relative to the insertion member 411 to move the insertion member 411 between the guiding section 422 and the engaging section 423. Preferably, an extending length of the guiding section 422 is larger than or equal to ½ of a length of the push rod 22; and the engaging section 423 integrally extends from an end of the guiding section 422 close to the piston 21 for smooth operation. In other embodiments, the insertion member may be disposed on the push rod, and the slot may be disposed on the barrel; the first positioning portion may be a pin, and the second positioning portion may be a through hole; the slot may have a plurality of said engaging sections so as to position the piston at different positions in the axial direction.

The liquid filling device 1 further includes a sleeve member 50 connected with the barrel 10, and the sleeve member 50 defines a channel 51 communicated with the through hole 12 and configured to be communicated with a pipe member. Moreover, the liquid filling device 1 further includes a valve member 60 close to the through hole 12, and the valve member 60 is configured to be externally operable to block a communication between the liquid storage space 11 and an external environment of the barrel 10 via the through hole 12. In this embodiment, the valve member 60 is a ball valve disposed on the sleeve member 50 and being operable to block the channel 51, which has a simple structure and is convenient to be arranged.

Figure 3:
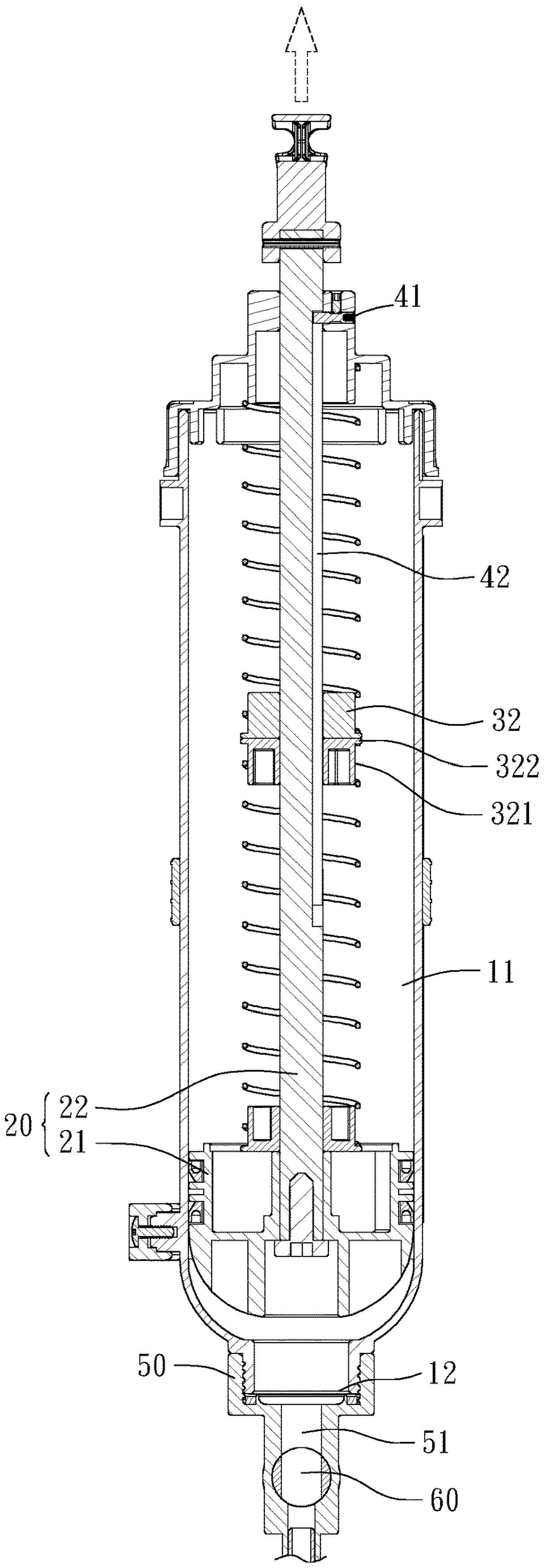
FIG. 3 is a cross-sectional view of a preferable embodiment of the present invention.
Figure 4:
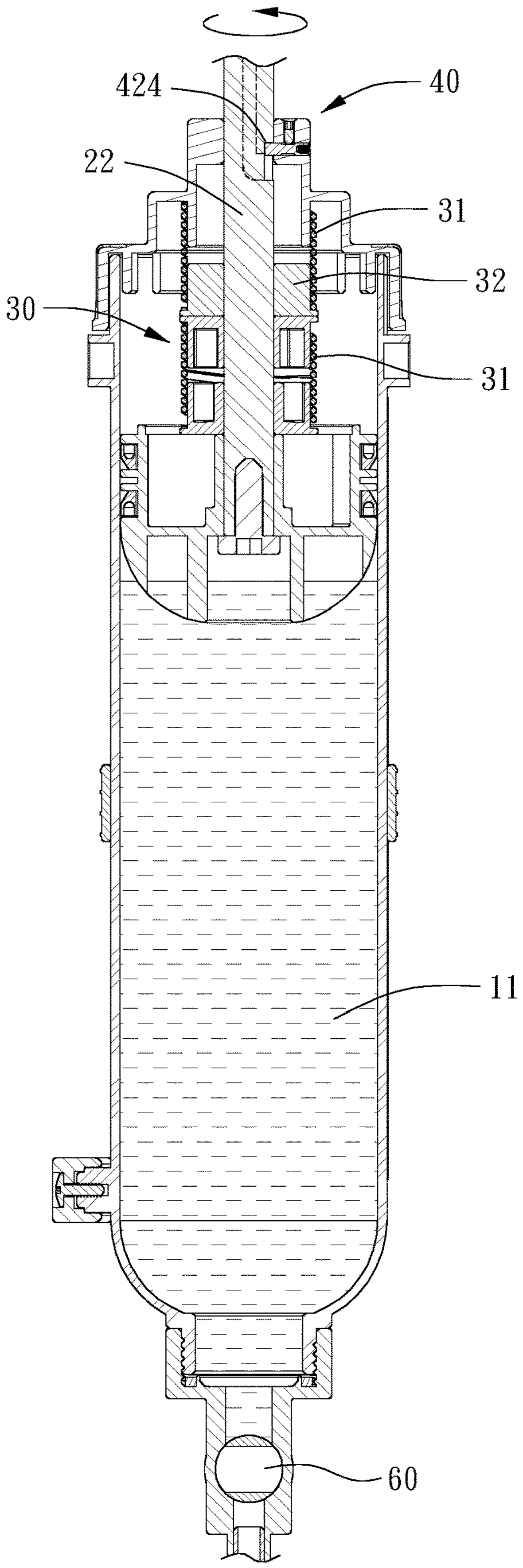
FIG. 4 is a drawing showing operation of a preferable embodiment of the present invention.
Figure 5:
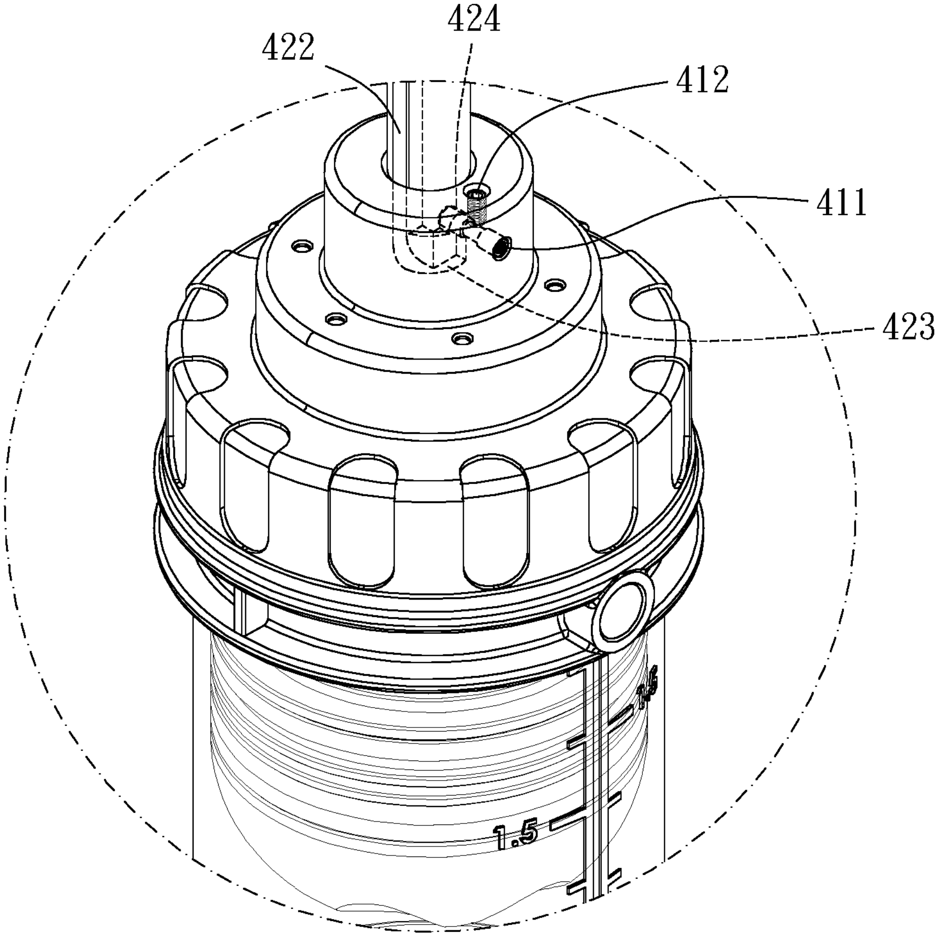
FIG. 5 is a partial enlargement according to a preferable embodiment of the present invention.

In this embodiment, the barrel 10 includes a body 13 and a lid 14 covered on the body 13, and the body 13 is preferably made of transparent or translucent material, which is convenient to observe the liquid in the liquid storage space 11. Refer to FIGS. 3 to 5, in operation, the valve member 60 is opened and the through hole 12 is communicated with the external environment, then the push rod 22 is pulled in the direction remote from the through hole 12 to draw the liquid and deform the force accumulating assembly 30. After that, the locking mechanism 40 is moved to the locking position, and the valve member 60 is closed. In another way, the push rod 22 is pulled in the direction remote from the through hole 12 and the force accumulating assembly 30 accumulates force, and the locking mechanism 40 is moved to the locking position, and the valve member 60 is closed to block the channel 51, then the liquid is filled through an opening of the body 13 covered by the lid 14. When the channel 51 is communicated with a container to be filled (such as an oil tank), the valve member 60 is opened and the locking mechanism 40 is moved to the release position so that the two said elastic members 31 can stretch to push the piston 21 for filling, which is easy to operate and laborsaving.

Furthermore, the slot 421 further includes an extending section 424 extending transversely to the engaging section 423 and opposite to the guiding section 422. When the insertion member 411 is located within the extending section 424, the push rod 22 is non-rotatable relative to the barrel 10. In this embodiment, the insertion member 411 is inserted within the lid 14 in a direction lateral to the axial direction A, and a screwing member 412 is interfered with the insertion member 411 in an insertion direction of the insertion member 411 to avoid detachment of the insertion member 411, which is easy to process and provides stable assembling. The extending section 424 and the guiding section 422 are parallel to each other. When the insertion member 411 is engaged within the extending section 424, the push rod 22 and the lid 14 are non-rotatable relative to each other, which prevents the locking mechanism 40 from being moved unexpectedly to the release position during operation and is safe when opening the lid 14. For filling the liquid, the push rod 22 is pushed forward and then rotated to move the insertion member 411 to the guiding section 422 for automatic filling, which is easy to operate.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A liquid filling device, including:

a barrel, defining an axial direction, including a liquid storage space and a through hole communicated with the liquid storage space;

a piston assembly, including a piston and a push rod connected with the piston, the piston being axially movable and disposed in the liquid storage space; and a force accumulating assembly, disposed between the barrel and the piston assembly, wherein when the force accumulating assembly accumulates force, the piston is driven by the force accumulating assembly to move and push a liquid in the liquid storage space;

wherein the force accumulating assembly includes two elastic members and at least one connecting member which are sleeved to the push rod, the at least one connecting member is movable relative to the push rod, and the two elastic members are located at two opposite sides of the at least one connecting member and elastically abutted against and between the barrel and the piston.

2. The liquid filling device of claim 1, wherein the two elastic members are elastically abutted against and between the barrel and the piston, and the two elastic members accumulates force when the push rod drives the piston to move in a direction remote from the through hole.

3. The liquid filling device of claim 1, wherein in the axial direction, a distance that the piston is driven to move by the force accumulating assembly is larger than or equal to ¼ of a length of the liquid storage space.

4. The liquid filling device of claim 1, further including a valve member close to the through hole, wherein the valve member is configured to be externally operable to block a communication between the liquid storage space and an external environment of the barrel via the through hole.

5. The liquid filling device of claim 1, further including a locking mechanism, wherein the locking mechanism includes a first positioning portion disposed on the barrel and a second positioning portion disposed on the piston assembly, the second positioning portion is movable relative to the first positioning portion between a locking position and a release position; and when the push rod drives the piston to move in a direction remote from the through hole and the force accumulating assembly accumulates force, the second positioning portion is moved to the locking position so that the piston is unmovable in a direction toward the through hole.

6. The liquid filling device of claim 5, wherein one of the first positioning portion and the second positioning portion is an engaging recess, and the other of the first positioning portion and the second positioning portion is an engaging projection axially engaged within the engaging recess.

7. The liquid filling device of claim 5, wherein the first positioning portion includes an insertion member, the second positioning portion includes a slot disposed on the push rod, at least a portion of the insertion member is movably disposed within the slot, the slot includes a guiding section extending in the axial direction and an engaging section extending transversely to the guiding section, and the push rod is rotatable relative to the insertion member to move the insertion member between the guiding section and the engaging section.

8. The liquid filling device of claim 7, wherein the slot further includes an extending section extending transversely to the engaging section and opposite to the guiding section, and when the insertion member is located within the extending section, the push rod is non-rotatable relative to the barrel.

9. The liquid filling device of claim 4, wherein the two elastic members are elastically abutted against and between the barrel and the piston, and the two elastic members accumulate force when the push rod drives the piston to move in a direction remote from the through hole; each said connecting member includes an annular wall and a flange radially protruding from the annular wall, two said connecting members are abutted against each other through respective sides on which said flanges are provided, an end of each of the two elastic members is sleeved to one said annular wall and axially abutted against one said flange; in the axial direction, a distance that the piston is driven to move by the force accumulating assembly is larger than or equal to ¼ of a length of the liquid storage space; the liquid filling device further includes a sleeve member connected with the barrel, the sleeve member defines a channel communicated with the through hole and configured to be communicated with a pipe member, the valve member is a ball valve disposed on the sleeve member and being operable to block the channel; the liquid filling device further includes a locking mechanism, the locking mechanism includes a first positioning portion disposed on the barrel and a second positioning portion disposed on the piston assembly, the second positioning portion is movable relative to the first positioning portion between a locking position and a release position; and when the push rod drives the piston to move in the direction remote from the through hole and the force accumulating assembly accumulates force, the second positioning portion is moved to the locking position so that the piston is unmovable in a direction toward the through hole; one of the first positioning portion and the second positioning portion is an engaging recess, and the other of the first positioning portion and the second positioning portion is an engaging projection axially engaged within the engaging recess; the first positioning portion includes an insertion member, the second positioning portion includes a slot disposed on the push rod, at least a portion of the insertion member is movably disposed within the slot, the slot includes a guiding section extending in the axial direction and an engaging section extending transversely to the guiding section, and the push rod is rotatable relative to the insertion member to move the insertion member between the guiding section and the engaging section; an extending length of the guiding section is larger than or equal to ½ of a length of the push rod; and the engaging section integrally extends from an end of the guiding section close to the piston.

* * * * *